United States Patent
Shiraishi et al.

(10) Patent No.: US 6,802,115 B2
(45) Date of Patent: Oct. 12, 2004

(54) WORKING METHOD OF BAR BLOCK AND MANUFACTURING METHOD OF THIN-FILM MAGNETIC HEAD

(75) Inventors: Masashi Shiraishi, Kwai Chung (HK); Koichi Miyagawa, Kwai Chung (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 243 days.

(21) Appl. No.: 10/171,635

(22) Filed: Jun. 17, 2002

(65) Prior Publication Data

US 2003/0005573 A1 Jan. 9, 2003

(30) Foreign Application Priority Data

Jul. 9, 2001 (JP) ........................................ 2001-207989

(51) Int. Cl.[7] .......................... G11B 5/127; H04R 31/00
(52) U.S. Cl. ..................... 29/603.2; 29/417; 29/603.06; 29/603.07; 29/603.13; 360/123; 360/126; 360/317; 417/127; 417/128; 216/39; 216/41; 216/48
(58) Field of Search ..................... 29/412, 417, 603.06, 29/603.07, 603.13; 360/123, 126, 317; 427/127, 128

(56) References Cited

U.S. PATENT DOCUMENTS 4,939,837 A * 7/1990 Krounbi .................. 29/603.08
5,095,613 A * 3/1992 Hussinger et al. ....... 29/603.17
5,465,186 A * 11/1995 Bajorek et al. ............. 360/323
5,559,051 A * 9/1996 Voldman et al. ............... 438/3
6,703,566 B1 * 3/2004 Shiraishi et al. ............ 174/260

FOREIGN PATENT DOCUMENTS

JP          62132210 A    *   6/1987    ............ G11B/5/31

OTHER PUBLICATIONS

"DC resistance instability in magnetoresistive recording heads"; Du, S.X.; Villaume, G.M.; Henderson, M.R.; Magnetics, IEEE Transactions on, vol. 36, Issue: 5, Sep. 2000 pp.:2493–2495.*

* cited by examiner

*Primary Examiner*—A. Dexter Tugbang
*Assistant Examiner*—Paul Kim
(74) *Attorney, Agent, or Firm*—Armstrong, Kratz, Quintos, Hanson & Brooks, LLP

(57) ABSTRACT

A working method of a bar block with a plurality of magnetic head elements and a plurality of pairs of electrode terminals electrically connected to the plurality of magnetic head elements arranged on an element-formed surface of the bar block in at least one line. This method includes a step of pre-laminating an ACF on the element-formed surface of the bar block, a step of bonding a conductive plate member with a plurality of projections located at positions faced to the plurality of pairs of terminal electrodes of the bar block, respectively, on the ACF so that each pair of the terminal electrodes is electrically short-circuited with each other, and a step of, then, working the bar block.

6 Claims, 2 Drawing Sheets

WORKING METHOD OF BAR BLOCK AND MANUFACTURING METHOD OF THIN-FILM MAGNETIC HEAD

BACKGROUND OF THE INVENTION

1. Field of the Invention

The present invention relates to a working method of a bar block with a plurality of magnetic head sliders arranged in at least one line and to a manufacturing method of a thin-film magnetic head.

2. Description of the Related Art

Recent demand for higher recording density in a hard disk drive (HDD) apparatus makes a request of a thin-film magnetic head to have a higher sensitivity and a higher output characteristics. In order to satisfy the request, a thin-film magnetic head with a general anisotropic magnetoresistive effect (AMR) element, a thin-film magnetic head with a giant magnetoresistive effect (GMR) element utilizing, for example, a spin valve effect, and a thin-film magnetic head with a tunneling magnetoresistive effect (TMR) element are proposed and going into actual use.

When manufacturing thin-film magnetic heads with these high sensitive magnetoresistive effect (MR) elements, it is necessary to take countermeasures against breakdown of the MR elements as a result of electrostatic discharge (ESD).

A bar block obtained by dicing a wafer on which many thin-film magnetic head elements are formed has a plurality of aligned magnetic head elements. During machining of this bar block (slider working), it will be necessary to take countermeasures against an ESD-breakdown.

Conventionally, as a countermeasure against an ESD-breakdown during a slider working, electrode terminals or bonding pads electrically connected to an MR element are short-circuited by an electrically conductive ball such as an Au ball. After the slider working, the conductive ball is removed from the bonding pads.

However, the bonding process of the conductive balls between the bonding pads is very complicated, and also when the conductive ball for short-circuiting the bonding pads is removed after the slider working, damage may often occur at these bonding pads.

SUMMARY OF THE INVENTION

It is therefore an object of the present invention to provide a working method of a bar block and a manufacturing method of a thin-film magnetic head, whereby countermeasures against an ESD-breakdown can be easily taken.

Another object of the present invention is to provide a working method of a bar block and a manufacturing method of a thin-film magnetic head, whereby countermeasures against an ESD-breakdown can be taken without causing damage to bonding pads for a magnetic head element.

According to the present invention, a working method of a bar block with a plurality of magnetic head elements and a plurality of pairs of electrode terminals electrically connected to the plurality of magnetic head elements arranged on an element-formed surface of the bar block in at least one line is provided. This method includes a step of pre-laminating an anisotropic conductive film (ACF) on the element-formed surface of the bar block, a step of bonding a conductive plate member with a plurality of projections located at positions faced to the plurality of pairs of terminal electrodes of the bar block, respectively, on the ACF so that each pair of the terminal electrodes is electrically short-circuited with each other, and a step of, then, working the bar block.

Also, according to the present invention a manufacturing method of a thin-film magnetic head, includes a step of forming by a thin-film fabrication method many of magnetic head elements and many pairs of electrode terminals electrically connected to the many of magnetic head elements on an wafer, a step of dicing the wafer to form a plurality of bar blocks each having a plurality of the magnetic head elements and a plurality of pairs of the electrode terminals electrically connected to the plurality of magnetic head elements arranged on an element-formed surface of the bar block in at least one line, a step of pre-laminating an ACF on the element-formed surface of the bar block, a step of bonding a conductive plate member with a plurality of projections located at positions faced to the plurality of pairs of terminal electrodes of the bar block, respectively, on the ACF so that each pair of the terminal electrodes is electrically short-circuited with each other, a step of, then, working the bar block, and a step of cutting the bar block into separated individual thin-film magnetic heads.

An ACF is pre-laminated on an element-formed surface of a bar block and a conductive plate member with projections located to face the respective terminal electrodes of the bar block is bonded on the ACF with a temperature and a pressure. Thus, a short-circuit from one terminal electrode, through the ACF, the projection of the conductive plate member, the body of the conductive plate member, the projection of the conductive plate member and the ACF to the other electrode terminal is formed. Under this short-circuited state, the bar block can be worked.

Because the electrical short-circuit can be achieved only by pre-laminating the ACF on the element-formed surface of the bar block and by bonding the conductive plate member on the ACF with a temperature and a pressure, countermeasures against an ESD-breakdown can be easily taken. Also, the conductive plate member can be easily detached by removing the ACF without causing damage to bonding pads for a magnetic head element. Furthermore, because the ACF covers the entire element-formed surface of the bar block, this surface can be effectively protected during slider working.

It is preferred that the method further includes a step of removing the anisotropic conductive film and the conductive plate member from the bar block after performing the working step of the bar block but before performing the cutting step.

It is also preferred that the removing step includes removing the anisotropic conductive film from the bar block by using a solvent.

It is further preferred that the plurality of magnetic head elements include a plurality of MR elements.

Further objects and advantages of the present invention will be apparent from the following description of the preferred embodiments of the invention as illustrated in the accompanying drawings.

DESCRIPTION OF THE PREFERRED EMBODIMENTS

Figure 1:
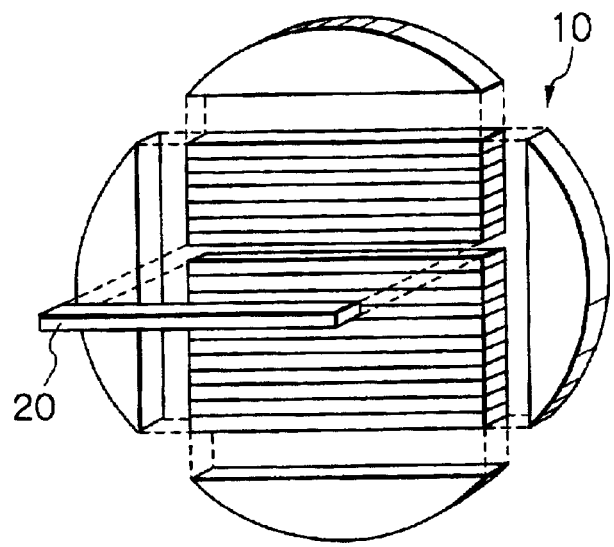
FIG. 1 is an oblique view schematically illustrating a wafer of thin-film magnetic heads in one fabrication process as a preferred embodiment of a manufacturing method according to the present invention.

FIG. 1 schematically illustrates a wafer of thin-film magnetic heads in a fabrication process as a preferred embodiment of a manufacturing method according to the present invention.

As shown in the figure, many thin-film magnetic head elements are formed in matrix on an wafer 10 made of, for example, Al—TiC, and then the wafer 10 is diced into a plurality of bar blocks 20 so that each bar block has a plurality of thin-film magnetic head elements arranged in at least one line.

Figure 2:
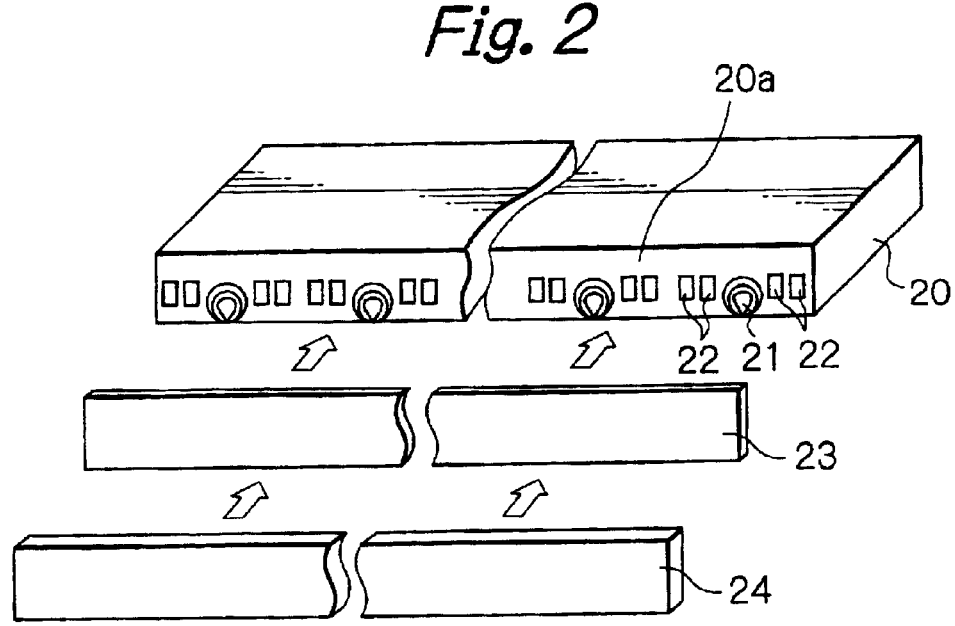
FIG. 2 is an oblique view illustrating a process for attaching an ACF and a conductive metal member to a bar block diced and separated from the wafer shown in FIG. 1.

On an element-formed surface 20a of each bar block 20, as shown in FIG. 2, formed are a plurality of magnetic head elements 21 and a plurality of pairs of electrode terminals 22 electrically connected to these magnetic head elements 21. In this embodiment, each of the magnetic head elements 21 consists of an inductive write head element and an MR read head element such as an AMR, GMR or TMR head element.

As shown in FIG. 2, an anisotropic conductive film (ACF) 23 is pre-laminated on the element formed surface 20a of the diced bar block 20 to cover its whole surface. Then, a conductive metal plate member 24 is bonded to the ACF 23 with a temperature and a pressure.

Figure 3:
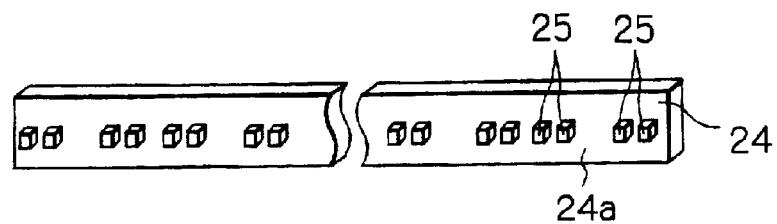
FIG. 3 is an oblique view illustrating a bonding surface of the conductive metal member shown in FIG. 2.

The ACF 23 is a known connection film consisting of a binder filled with dispersed conductive particles and having a characteristic of conductivity in the thickness direction and insulation in the plane after the thermocompression bonding process. The conductive metal plate member 24 is made of electrically conductive metal material such as copper or stainless steel, for examples and has a plurality of projections 25 formed by etching, for example, on its bonding surface 24a, as shown in FIG. 3. These projections 25 are arranged at positions corresponding to the terminal electrodes 22 formed on the bar block 20, respectively.

By performing the thermocompression bonding of the conductive metal plate member 24 onto the ACF 23 so that each projection 25 of the metal plate member 24 presses each terminal electrode 22 of the bar block 20, the conductive particles in the ACF 23 between the projections 25 of the metal plate member 24 and the terminal electrodes 22 of the bar block 20 make electrical contact while leaving the conductive particles outside of the bonding area dispersed. Thus, each pair of the electrode terminals 22 is short-circuited through a circuit from one terminal electrode 22, through the ACF 23, the projection 25 of the conductive metal member 24, the body of the conductive metal member 24, the projection 25 of the conductive metal member 24 and the ACF 23 to the other electrode terminal 22.

Figure 4:
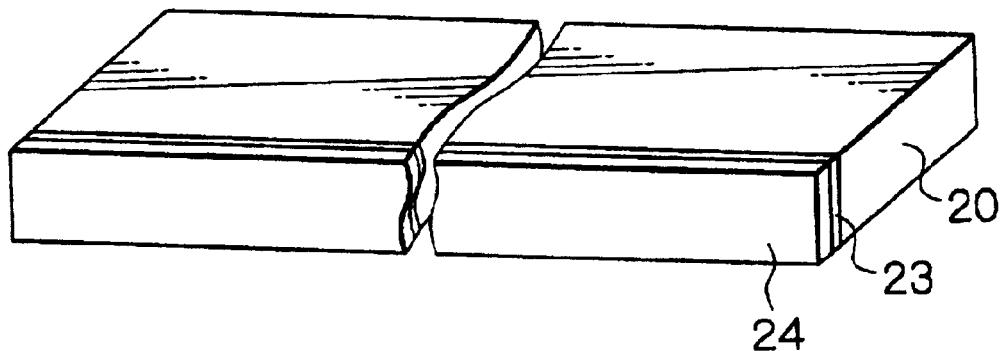
FIG. 4 is an oblique view illustrating a short-circuited state of the bar block to which the ACF and the conductive metal member are attached.
Figure 5:
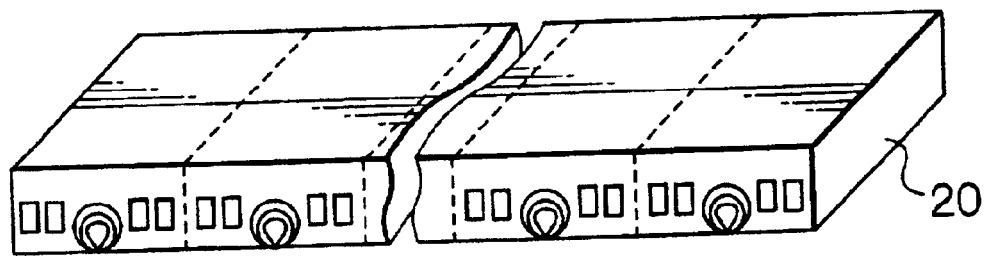
FIG. 5 is an oblique view illustrating the bar block from which the ACF and the conductive metal member are detached.

Various slider workings including an MR height machining process, for example, are performed under this short-circuited state shown in FIG. 4. Then, the ACE 23 is removed from the element-formed surface 20a of the bar block 20 using a solvent such as acetone. Simultaneously, the conductive metal plate member 24 is detached. This state is shown in FIG. 5.

Figure 6:
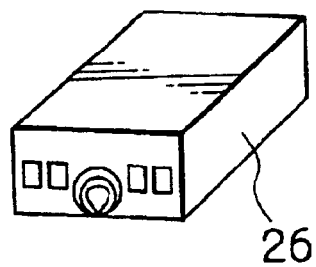
FIG. 6 is an oblique view illustrating an individual magnetic head slider separated by dicing the wafer.

Thereafter, the bar block 20 is diced and separated to obtain individual magnetic head sliders 26 shown in FIG. 6.

As aforementioned, according to this embodiment, because an electrical short-circuit can be achieved only by pre-laminating the ACE 23 on the element-formed surface 20a of the bar block 20 and by bonding the conductive metal plate member 24 on the ACF 23 with a temperature and a pressure, countermeasures against an ESD-breakdown can be easily taken. Also, the conductive metal plate member 24 can be easily detached by removing the ACF 23 by a solvent without causing damage to bonding pads for a magnetic head element. Furthermore, because the ACE 23 covers the entire element-formed surface 20a of the bar block 20, this surface 20a can be effectively protected during slider machining.

In the aforementioned embodiment, although the electrode terminals are short-circuited, these electrode terminals may be grounded by using the ACF 23 and the conductive metal plate member 24. Also, it is possible to short-circuit only terminal electrodes for the MR elements that will, in particular, be weakened against an ESD-breakdown.

Many widely different embodiments of the present invention may be constructed without departing from the spirit and scope of the present invention. It should be understood that the present invention is not limited to the specific embodiments described in the specification, except as defined in the appended claims.

What is claimed is:

1. A working method of a bar block with a plurality of magnetic head elements and a plurality of pairs of electrode terminals electrically connected to said plurality of magnetic head elements arranged on an element-formed surface of said bar block in at least one line, said method comprising the steps of:

pre-laminating an anisotropic conductive film on said element-formed surface of said bar block after performing said working step of said bar block;

bonding a conductive plate member with a plurality of projections located at positions facing said plurality of pairs of terminal electrodes of said bar block, respectively, on said anisotropic conductive film so that each pair of said terminal electrodes is electrically short-circuited with each other;

working said bar block; and removing said anistropic conductive film and said conductive plate member from said bar block.

2. The method as claimed in claim 1, wherein said removing step comprises removing said anisotropic conductive film from said bar block by using a solvent.

3. The method as claimed in claim 1, wherein said plurality of magnetic head elements comprise a plurality of magnetoresistive effect elements.

4. A manufacturing method of a thin-film magnetic head, comprising the steps of:

forming by a thin-film fabrication method many magnetic head elements and many pairs of electrode terminals electrically connected to said many of magnetic head elements on a wafer;

dicing said wafer to form a plurality of bar blocks each having a plurality of the magnetic head elements and a plurality of pairs of the electrode terminals electrically connected to said plurality of magnetic head elements arranged on an element-formed surface of said bar block in at least one line;

pre-laminating an anisotropic conductive film on said element-formed surface of said bar block after performing said working step of said bar block;

bonding a conductive plate member with a plurality of projections located at positions facing said plurality of pairs of terminal electrodes of said bar block, respectively, on said anisotropic conductive film so that each pair of said terminal electrodes is electrically short-circuited with each other;

working said bar block;

cutting said bar block into separated individual thin-film magnetic heads; and removing said anisotropic conductive film and said conductive plate member from said bar block.

5. The manufacturing method as claimed in claim 4, wherein said removing step comprises removing said anisotropic conductive film from said bar block by using a solvent.

6. The manufacturing method as claimed in claim 4, wherein said plurality of magnetic head elements comprise a plurality of magnetoresistive effect elements.

* * * * *